(12) United States Patent
Murray

(10) Patent No.: US 9,751,661 B2
(45) Date of Patent: Sep. 5, 2017

(54) FLEXIBLE POUCH AND METHOD OF FORMING FLEXIBLE POUCH

(71) Applicant: Pouch Pac Innovations, LLC, Sarasota, FL (US)

(72) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 629 days.

(21) Appl. No.: 14/137,245

(22) Filed: Dec. 20, 2013

(65) Prior Publication Data

US 2014/0174035 A1 Jun. 26, 2014

Related U.S. Application Data

(63) Continuation-in-part of application No. 12/233,631, filed on Sep. 19, 2008, now Pat. No. 8,613,548, which
(Continued)

(51) Int. Cl.
*B65D 35/02* (2006.01)
*B29C 65/02* (2006.01)
(Continued)

(52) U.S. Cl.
CPC .............. *B65D 35/02* (2013.01); *B29C 65/02* (2013.01); *B29C 66/71* (2013.01); *B29C 66/72* (2013.01); *B29C 66/74* (2013.01); *B32B 15/085* (2013.01); *B32B 15/088* (2013.01); *B32B 15/09* (2013.01); *B32B 15/20* (2013.01); *B32B 27/08* (2013.01);
(Continued)

(58) Field of Classification Search
CPC ..... B32B 15/085; B32B 15/088; B32B 15/09; B32B 15/20; B32B 27/32; B32B 27/327; B32B 27/34; B32B 27/36; Y10T 428/1359; Y10T 428/31681; Y10T 428/31692; B65D 75/008; B65D 35/02; B65D 37/00;
(Continued)

(56) References Cited

U.S. PATENT DOCUMENTS 51,722 A 12/1865 Hurd
733,449 A 7/1903 Willsie
(Continued)

FOREIGN PATENT DOCUMENTS

JP 06001358 1/1994
JP 07-044579 Y2 2/1995
(Continued)

OTHER PUBLICATIONS

U.S. Appl. No. 11/195,906, filed Aug. 3, 2005.
U.S. Appl. No. 12/061,788, filed Apr. 3, 2008.
U.S. Appl. No. 12/233,631, filed Sep. 19, 2008.

*Primary Examiner* — Walter B Aughenbaugh
(74) *Attorney, Agent, or Firm* — Dinsmore & Shohl LLP

(57) ABSTRACT

A flexible pouch for packaging a product therein having a pouch panel formed of a material having a layer of polyethylene terephthalate, a layer of aluminum, a layer of nylon, and a layer of polyethylene. The layer of polyethylene terephthalate has a thickness of 12 to 15 microns, the layer aluminum has a thickness of 7 to 9 microns, the layer of nylon has a thickness of 12 to 18 microns, and the layer of polyethylene has a thickness of 70-200 microns.

8 Claims, 13 Drawing Sheets

Related U.S. Application Data is a continuation-in-part of application No. 11/195,906, filed on Aug. 3, 2005, now abandoned, application No. 14/137,245, which is a continuation-in-part of application No. 12/061,788, filed on Apr. 3, 2008, now abandoned.

(60) Provisional application No. 60/598,394, filed on Aug. 3, 2004, provisional application No. 60/909,797, filed on Apr. 3, 2007.

(51) Int. Cl.
| | |
|---|---|
| B65B 3/02 | (2006.01) |
| B29C 65/00 | (2006.01) |
| B65B 3/04 | (2006.01) |
| B32B 27/34 | (2006.01) |
| B65D 75/00 | (2006.01) |
| B32B 27/36 | (2006.01) |
| B32B 15/09 | (2006.01) |
| B32B 27/32 | (2006.01) |
| B65D 75/58 | (2006.01) |
| B65D 30/08 | (2006.01) |
| B65D 37/00 | (2006.01) |
| B32B 15/085 | (2006.01) |
| B32B 15/088 | (2006.01) |
| B32B 15/20 | (2006.01) |
| B32B 27/08 | (2006.01) |

(52) U.S. Cl.
CPC ............ *B32B 27/32* (2013.01); *B32B 27/327* (2013.01); *B32B 27/34* (2013.01); *B32B 27/36* (2013.01); *B65B 3/02* (2013.01); *B65B 3/04* (2013.01); *B65D 31/02* (2013.01); *B65D 37/00* (2013.01); *B65D 75/008* (2013.01); *B65D 75/5883* (2013.01); *B31B 2219/9054* (2013.01); *B31B 2221/10* (2013.01); *B32B 2307/7244* (2013.01); *B32B 2439/06* (2013.01); *B32B 2439/46* (2013.01); *Y10T 428/1338* (2015.01); *Y10T 428/1359* (2015.01); *Y10T 428/31681* (2015.04); *Y10T 428/31692* (2015.04)

(58) Field of Classification Search
CPC ......... B29C 65/02; B29C 66/70; B29C 66/71; B29C 66/72; B29C 66/74; B65B 3/04
See application file for complete search history.

(56) References Cited

U.S. PATENT DOCUMENTS

| | | | |
|---|---|---|---|
| 2,189,174 A | 2/1940 | Hohl | |
| 2,365,651 A | 12/1944 | Shively | |
| 2,673,495 A | 3/1954 | Hecker | |
| 2,688,354 A | 9/1954 | Berger | |
| 2,703,671 A | 3/1955 | Kindseth | |
| 2,800,163 A | 7/1957 | Rusch | |
| 3,268,152 A | 8/1966 | Swartz | |
| 3,286,005 A | 11/1966 | Cook | |
| 3,304,977 A | 2/1967 | Hammons | |
| 3,355,080 A | 11/1967 | Rausing | |
| 3,372,859 A | 3/1968 | Bjorkengren et al. | |
| 3,478,952 A | 11/1969 | Perlman | |
| 3,483,061 A | 12/1969 | Amemiya et al. | |
| 3,516,537 A | 6/1970 | Griffiths et al. | |
| 3,542,190 A | 11/1970 | Keller | |
| 3,558,406 A | 1/1971 | Kugler | |
| 3,737,329 A | 6/1973 | Strelchuk | |
| 3,810,503 A | 5/1974 | Lewis, Jr. et al. | |
| 3,830,270 A | 8/1974 | Hagert et al. | |
| 3,924,008 A | 12/1975 | Ford et al. | |
| 3,982,029 A | 9/1976 | Rausing | |
| 4,078,717 A | 3/1978 | Stearley | |
| 4,232,048 A | 11/1980 | Palm et al. | |
| 4,232,721 A | 11/1980 | Martin et al. | |
| 4,310,578 A * | 1/1982 | Katsura ................. B32B 15/08 156/334 |
| 4,326,568 A | 4/1982 | Burton et al. | |
| 4,361,235 A | 11/1982 | Gautier | |
| 4,415,085 A | 11/1983 | Clarke et al. | |
| 4,418,733 A | 12/1983 | Kallman | |
| 4,498,591 A | 2/1985 | Smith, II | |
| 4,510,733 A | 4/1985 | Hansen et al. | |
| 4,530,440 A | 7/1985 | Leong | |
| 4,717,046 A | 1/1988 | Brogli | |
| 4,742,908 A | 5/1988 | Thomas, Jr. et al. | |
| 4,759,472 A | 7/1988 | Strenger | |
| 4,762,514 A | 8/1988 | Yoshida | |
| 4,848,421 A | 7/1989 | Froese et al. | |
| 4,886,373 A | 12/1989 | Corella | |
| 4,961,944 A | 10/1990 | Matoba et al. | |
| 4,998,646 A | 3/1991 | Sherman | |
| 4,999,978 A | 3/1991 | Kohlbach et al. | |
| 5,005,734 A | 4/1991 | Van Gordon et al. | |
| 5,078,509 A | 1/1992 | Center et al. | |
| 5,210,993 A | 5/1993 | van Boxtel | |
| 5,222,535 A | 6/1993 | Roders | |
| 5,267,591 A | 12/1993 | Wakabayashi et al. | |
| 5,307,955 A | 5/1994 | Viegas | |
| D351,101 S | 10/1994 | Linner | |
| 5,352,043 A | 10/1994 | Takagaki et al. | |
| 5,433,526 A | 7/1995 | Wild | |
| 5,485,714 A | 1/1996 | Montalvo | |
| 5,501,757 A | 3/1996 | Takagaki | |
| 5,613,779 A | 3/1997 | Niwa | |
| D404,296 S | 1/1999 | Durliat et al. | |
| 5,971,613 A | 10/1999 | Bell | |
| D422,488 S | 4/2000 | Gates | |
| 6,092,933 A | 7/2000 | Treu | |
| 6,098,836 A | 8/2000 | Gottselig | |
| 6,112,925 A | 9/2000 | Nahill et al. | |
| 6,149,024 A | 11/2000 | Deemer et al. | |
| 6,170,985 B1 | 1/2001 | Shabram, Jr. et al. | |
| 6,199,601 B1 | 3/2001 | Laudenberg | |
| 6,224,528 B1 | 5/2001 | Bell | |
| 6,270,819 B1 | 8/2001 | Wiese | |
| 6,289,654 B1 | 9/2001 | Yamaguchi et al. | |
| 6,293,897 B1 | 9/2001 | Anderson et al. | |
| 6,419,118 B1 | 7/2002 | Rees et al. | |
| 6,419,393 B1 | 7/2002 | Shibata | |
| 6,422,753 B1 | 7/2002 | Thomas | |
| 6,478,190 B2 | 11/2002 | Kuge et al. | |
| D470,415 S | 2/2003 | Weber | |
| 6,523,681 B1 | 2/2003 | Hacikyan | |
| 6,572,267 B1 | 6/2003 | Forman | |
| 6,631,801 B2 | 10/2003 | Boyd-Moss et al. | |
| D482,606 S | 11/2003 | Modjeski | |
| 6,641,307 B2 | 11/2003 | Matsuda et al. | |
| 6,655,837 B2 | 12/2003 | Matsuda et al. | |
| 6,667,081 B1 | 12/2003 | Aoki et al. | |
| 6,790,468 B1 | 9/2004 | Mize, Jr. et al. | |
| 6,805,261 B1 | 10/2004 | Laudenberg | |
| 6,851,578 B2 | 2/2005 | Hagihara | |
| 6,991,140 B2 | 1/2006 | Bourque et al. | |
| 7,025,198 B2 | 4/2006 | Bekele et al. | |
| 7,178,672 B2 | 2/2007 | Arkins | |
| D539,652 S | 4/2007 | Moretti | |
| D547,190 S | 7/2007 | Kuzma et al. | |
| D558,592 S | 1/2008 | Soderstrom | |
| 7,350,689 B1 | 4/2008 | Campbell | |
| D587,121 S | 2/2009 | Mongeon et al. | |
| D590,259 S | 4/2009 | Kunesh et al. | |
| D591,599 S | 5/2009 | Okin et al. | |
| 2002/0079238 A1 | 6/2002 | Wilson et al. | |
| 2002/0118895 A1 * | 8/2002 | Watabe ................ B65D 75/004 383/104 |
| 2002/0147091 A1 | 10/2002 | Healy et al. | |
| 2003/0071059 A1 | 4/2003 | Hagihara | |
| 2003/0221393 A1 | 12/2003 | Kothari | |
| 2004/0005100 A1 | 1/2004 | Versluys | |

(56) References Cited

U.S. PATENT DOCUMENTS

| | | |
|---|---|---|
| 2004/0101215 A1 | 5/2004 | Sellmeier et al. |
| 2004/0160077 A1 | 8/2004 | Burtin |
| 2004/0161177 A1 | 8/2004 | N'Dia |
| 2004/0234174 A1 | 11/2004 | Caudle |
| 2005/0053314 A1 | 3/2005 | Ikeda et al. |
| 2005/0117818 A1 | 6/2005 | Brans et al. |
| 2005/0265636 A1 | 12/2005 | Michalsky |
| 2006/0126970 A1 | 6/2006 | Perell |
| 2006/0196784 A1 | 9/2006 | Murray |
| 2006/0233467 A1 | 10/2006 | Mize, Jr. |
| 2007/0047851 A1 | 3/2007 | Sato et al. |
| 2007/0211967 A1 | 9/2007 | Murray |
| 2007/0217717 A1 | 9/2007 | Murray |
| 2008/0047851 A1 | 2/2008 | Smit et al. |
| 2008/0247684 A1 | 10/2008 | Binks et al. |
| 2008/0292225 A1 | 11/2008 | Dayrit et al. |
| 2009/0028470 A1 | 1/2009 | Murray |
| 2009/0056281 A1 | 3/2009 | Murray |
| 2009/0116768 A1 | 5/2009 | Huerta et al. |
| 2009/0120931 A1 | 5/2009 | Murray |
| 2010/0155396 A1 | 6/2010 | Warner |

FOREIGN PATENT DOCUMENTS

| | | |
|---|---|---|
| JP | 09-175541 A | 7/1997 |
| WO | 02090195 | 11/2002 |

\* cited by examiner

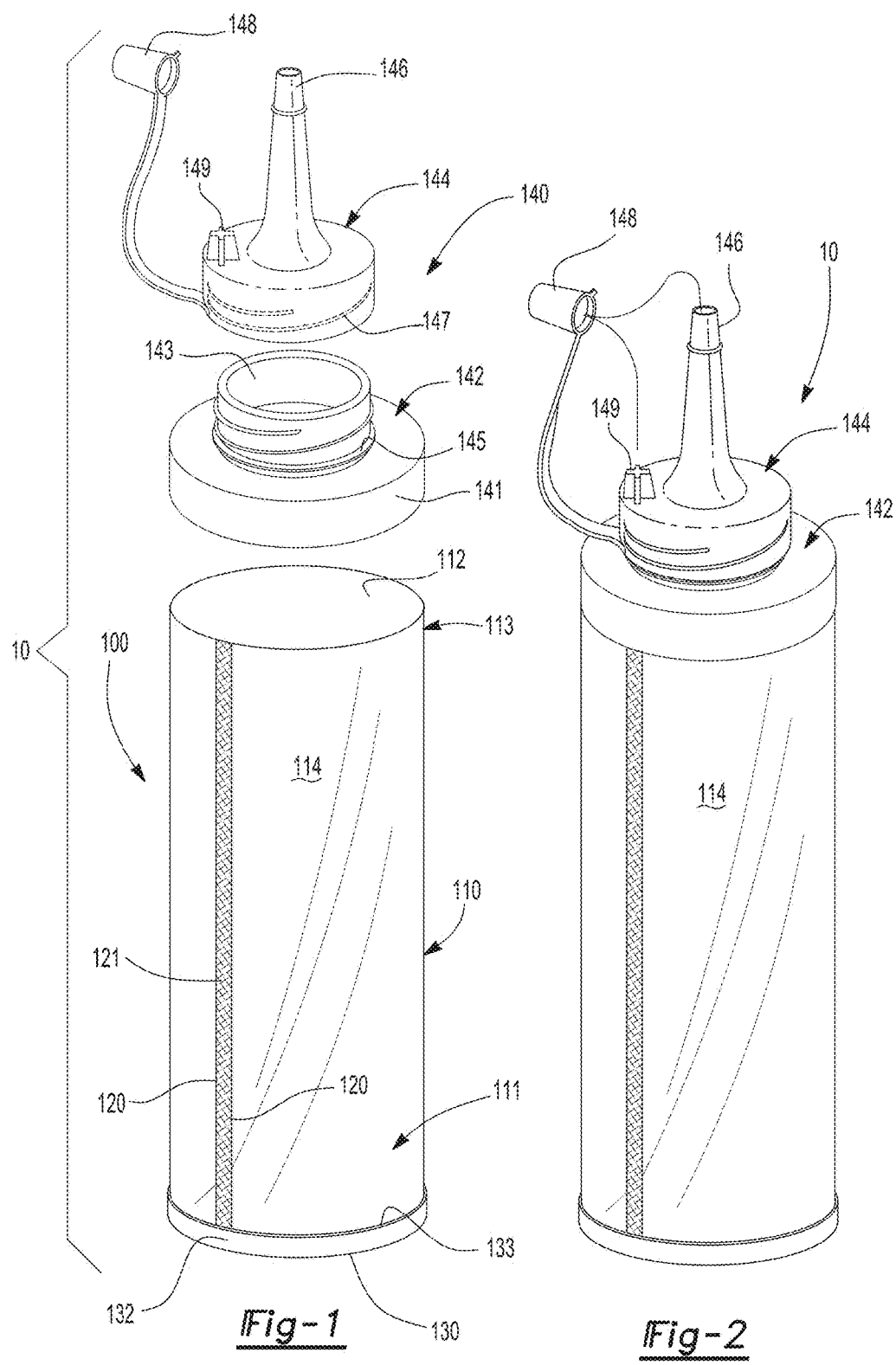

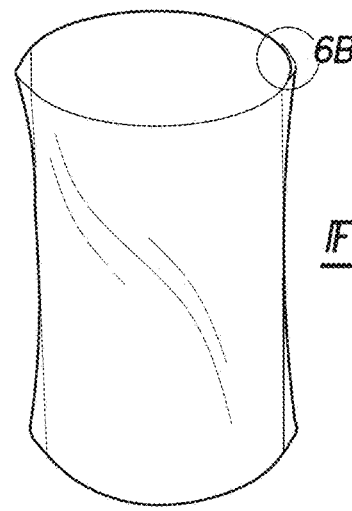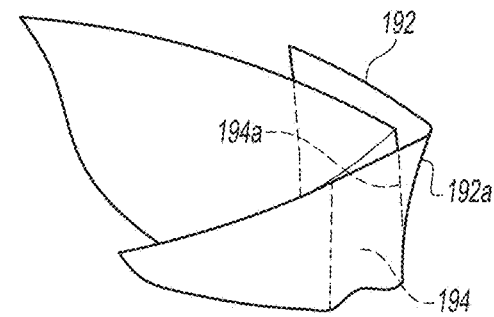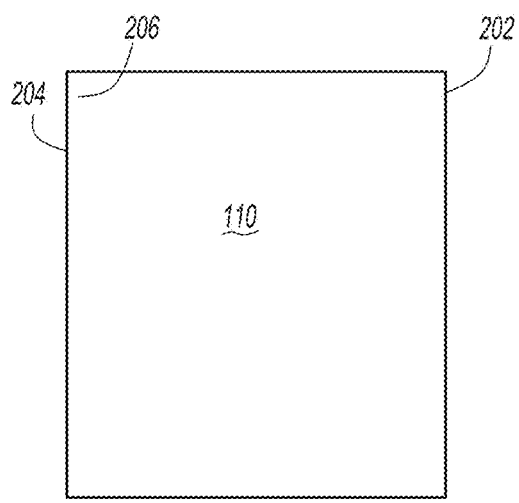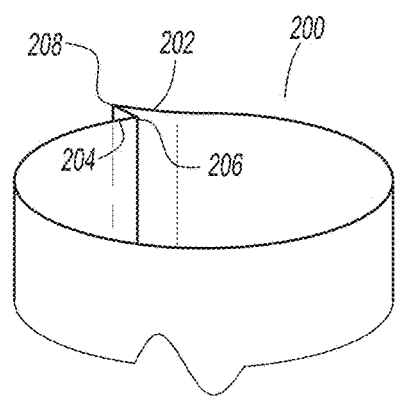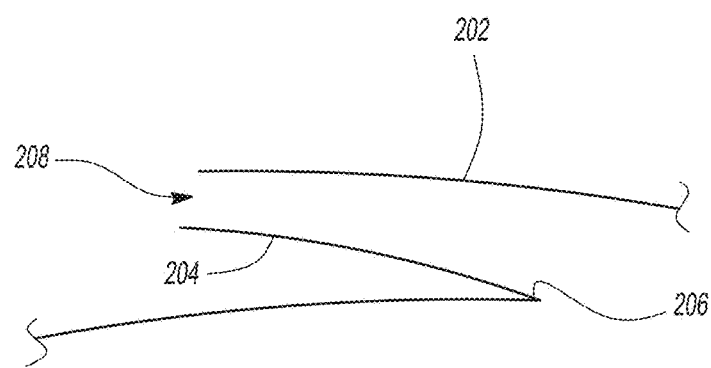

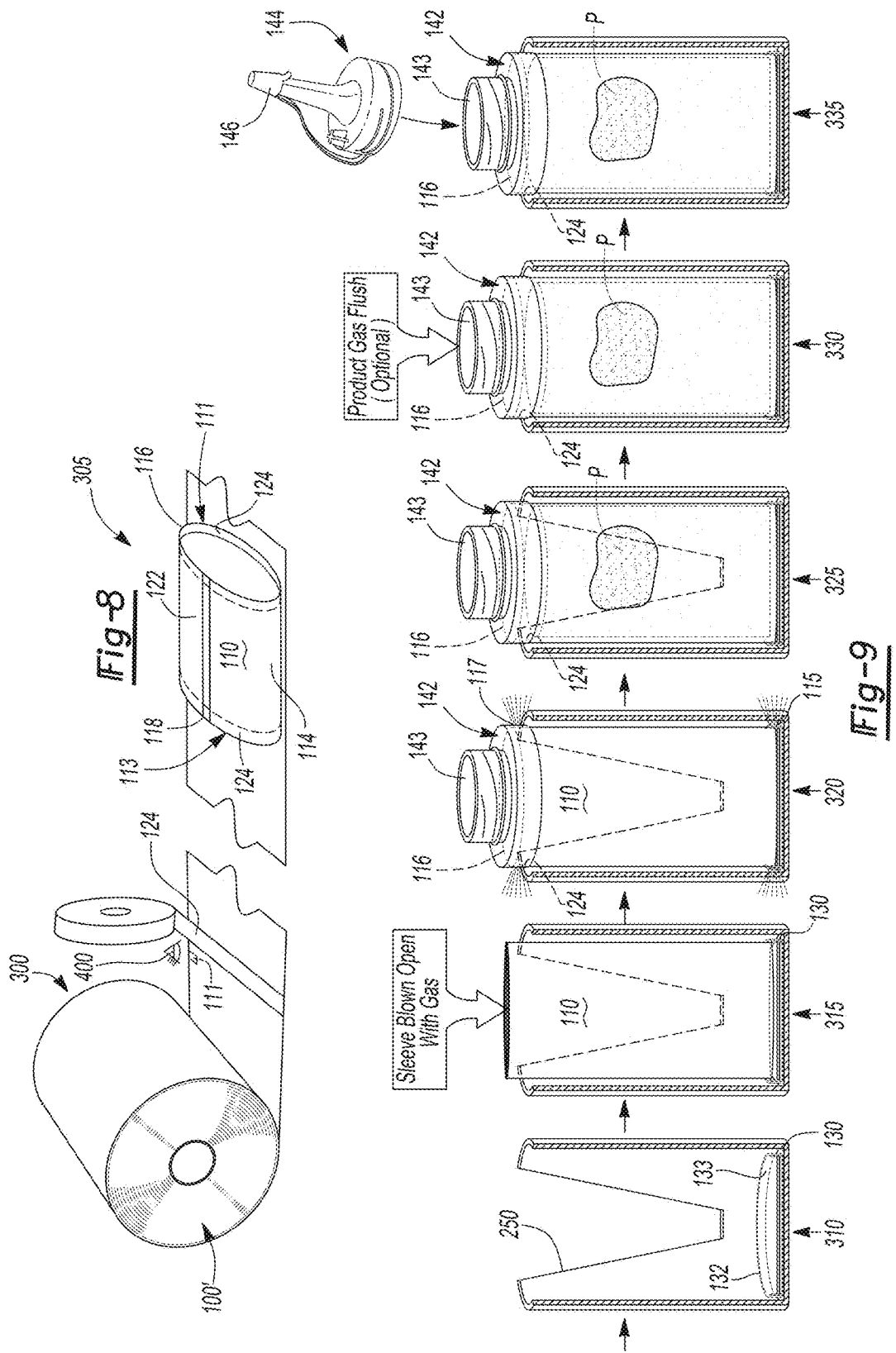

FLEXIBLE POUCH AND METHOD OF FORMING FLEXIBLE POUCH

CROSS-REFERENCE TO RELATED APPLICATIONS

This application is a continuation-in-part of U.S. patent application Ser. No. 12/233,631 filed Sep. 8, 2008, now U.S. Pat. No. 8,613,548 which is a continuation-in-part of U.S. patent application Ser. No. 11/195,906 filed Aug. 3, 2005, now abandoned which claims priority of U.S. Provisional Patent Application Ser. No. 60/598,394 filed Aug. 3, 2004, and this application is a continuation-in-part of U.S. patent application Ser. No. 12/061,788 filed Apr. 3, 2008, now abandoned which claims priority of U.S. Provisional Patent Application Ser. No. 60/909,797 filed on Apr. 3, 2007, all of which are incorporated herein by reference.

FIELD OF THE INVENTION

The present invention relates to a flexible pouch for packaging a product, and more specifically, to a flexible pouch having a pouch panel formed of a layer of polyethylene terephthalate, a layer of aluminum, a layer of nylon, and a layer of linear low density polyethylene, and a method of forming a flexible pouch formed of a pouch panel formed of a layer of polyethylene terephthalate, a layer of aluminum, a layer of nylon, and a layer of linear low density polyethylene.

BACKGROUND OF THE INVENTION

Various types of disposable containers are known to those skilled in the art for storing fluid and/or dry products such as a liquid, granular material, powder, and the like. Examples of such containers include metal cans, plastic bottles, glass bottles, and flexible pouches. In some instances, consumers prefer the convenience of flexible pouches over other types of containers due to the shape, size, shelf life, and storage capability thereof. In addition, a flexible pouch can be formed and filled on a single manufacturing line and thereby reduce storage space, logistics related to the manufacture and shipping of filled flexible pouches, etc. As such, manufacturers have recognized the packaging benefits with respect to flexible pouches.

Although flexible pouches have been used for some time to package and distribute various products; however, previous pouches have not provided adequate protection for the product stored therein, specifically, alcoholic beverages. Previous flexible pouches resulted in inadequate levels of oxygen permeability and sensory qualities, such as taste, flavor, aroma, and color, due to the composition of the flexible pouch. Specifically, the formulation of the pouch panel that forms the pouch.

Thus, a composition of a material used in the formation of the flexible pouch providing adequate protection against oxygen permeability and sensory qualities would be desirable.

SUMMARY OF THE INVENTION

The present invention discloses a flexible pouch and a method for forming a flexible pouch for packaging a product.

The flexible pouch having a pouch panel formed of a material having a layer of polyethylene terephthalate, a layer of aluminum, a layer of nylon, and a layer of polyethylene. The layer of polyethylene terephthalate having a thickness of 12 to 15 microns, the layer aluminum having a thickness of 7 to 9 microns, the layer of nylon having a thickness of 12 to 18 microns, and the layer of polyethylene having a thickness of 70-200 microns.

The layer of polyethylene is optionally formed of a layer of linear low density polyethylene.

A process for making and filling the flexible tube package includes laminating a layer of polyethylene terephthalate, a layer of aluminum, a layer of nylon, and a layer of polyethylene to form a pouch panel. The layer of polyethylene terephthalate having a thickness of 12 to 15 microns, the layer aluminum having a thickness of 7 to 9 microns, the layer of nylon having a thickness of 12 to 18 microns, and the layer of polyethylene having a thickness of 70-200 microns.

In some instances, the product can be an alcoholic beverage such as red wine, white wine, beer, and the like.

BRIEF DESCRIPTION OF THE DRAWINGS

FIG. 1 is an exploded perspective view of a flexible tube package according to an embodiment of the present invention;

FIG. 2 is a perspective view of the embodiment shown in FIG. 1;

FIG. 6A is a perspective view of a flexible tube package with an overlap seam in a side gusset;

FIG. 6B is a detailed view of the overlap seam in the side gusset shown in FIG. 6A;

FIG. 7A is a perspective view of a panel for a flexible tube package;

FIG. 7B is a sectional view of a flexible tube package formed using the panel of FIG. 7A and having an overlap S-type flat seam;

FIG. 7C is a detailed view of the S-type flat seam shown in FIG. 7B;

FIG. 8 is a schematic illustration of a process for making a flexible tube according to an embodiment of the present invention;

FIG. 9 is a schematic illustration of a process for making a flexible tube package out of the flexible tube shown in FIG. 8;

DETAILED DESCRIPTION OF THE INVENTION

Figure 3A:
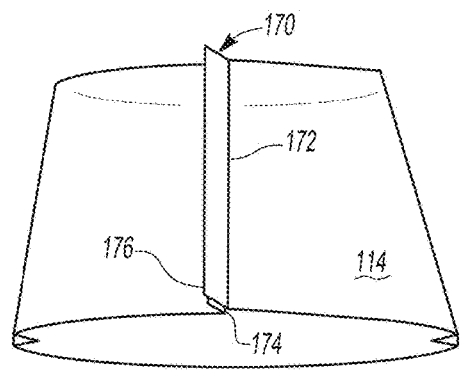
FIG. 3A is a perspective side view illustrating a folded flat seam for a flexible tube package.

The present invention discloses a flexible pouch and a method for making the flexible tube package. As such, the present invention has utility as a container to hold a product.

The flexible tube package can have a panel with a pair of side edges rolled into a tube shape. A side seal extends along the pair of side edges and affords for a tube to be made from the panel. An end cap can be sealed to one end of the tube and a fitment with an aperture can be sealed to an opposite end of the tube. In addition, a dispensing cap operable for product within the flexible tube package to be applied at a desired location can be attached to the fitment.

The side seal can extend longitudinally from one end of this tube to the opposite end of the tube in a generally straight line. In addition, the side seal can have an overlap seam with one of the side edges overlapping the other side edge. In some instances, a region of the panel proximate to one of the side edges can be folded along a fold line that is spaced apart from the edge, thereby creating a fold portion between the fold line and the edge. In addition, the fold portion can be folded outwardly 180 degrees relative to the panel and/or tube interior. In this manner, the side seal can include three layers of the panel and thereby provide stiffness, structural support, and the like for the flexible tube package. In some instances, reinforcement tape can be applied on an inner surface and/or an outer surface of the side seal and thereby provide additional stiffness, structural support, and the like for the flexible tube package.

The end cap can have a side wall that is sealed to an outer surface of the tube and the fitment can have a side wall sealed to an inner surface of the tube. It is appreciated that the dispensing cap can be attached to the fitment using any known method or device known to those skilled in the art, illustratively including a snap fit, a threaded attachment with complimentary threads on the fitment and the dispensing cap, and the like.

The process for making the flexible tube package includes providing a panel having a pair of side edges. In some instances, the panel side edges are generally parallel to each other and the panel is rolled into a tube shape. Thereafter, the side edges are sealed to form a side seal and a tube is made from the panel. In addition, an end cap can be sealed to one end of the tube and a fitment with an aperture can be sealed to an opposite end of the tube.

After the flexible tube package has been manufactured, it can be filled with a desired product through the aperture of the fitment and the dispensing cap can be attached to the fitment. It is appreciated that an individual can then grasp the flexible tube package with the product therewithin and apply the product by squeezing the flexible tube. For example and for illustrative purposes only, the flexible tube package can include a condiment such as ketchup, mustard, honey, pickle relish, and the like, and the condiment can be applied to a food item such as a hotdog, hamburger, etc.

Turning now to FIGS. 1 and 2, a flexible tube package according to an embodiment of the present invention is shown generally at reference numeral 10. The flexible tube package 10 can have a panel 100 rolled into the shape of a tube 110 with a pair of side edges 120 providing a seam extending along the length of the tube. A side seam or side seal 121 affords for the panel 110 to be formed into the tube 110, the tube 110 having an inner surface 112 and an outer surface 114.

To enclose the tube 110 formed from the panel 100, an end cap 130 can be sealed to one end 111 of the tube 110 and a dispensing member 140 can be sealed to an opposite end 113 of the tube. In addition, the end cap 130 can have a side wall 132 with an inner surface 133 sealed to the outer surface 114 of the tube 110 and the dispensing member 140 can have a fitment 142 with an outer surface 141 sealed to the inner surface 112 of the tube. In the alternative, the end cap 130 can be sealed to the inner surface 112 and/or the fitment 142 can be sealed to the outer surface 114 of the tube 110.

The fitment 142 can have an aperture 143 that affords for the flexible tube package 10 to be filled with a product therethrough. In addition, a dispensing cap 144 can be attached to the fitment 142 using any attachment mechanism and/or process known to those skilled in the art, illustratively including a snap fit, a pair of complementary threads 145 and 147, and the like. The dispensing cap 144 can also have a dispensing end 146 with a sealing cap 148. When not in use, the sealing cap 148 can be placed onto a holding stud 149 as known to those skilled in the art.

Figure 3B:
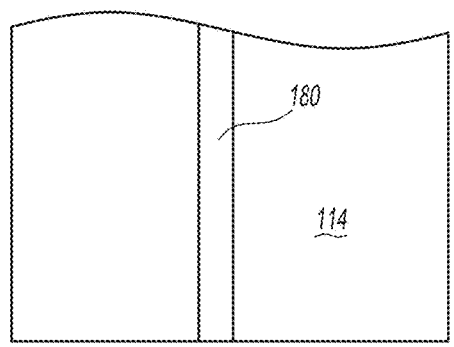
FIG. 3B is a side view of a flexible tube package with a folded flat seam.

The side seal 121 can include a flat seam 170 as illustrated in FIGS. 3A and 3B. The flat seam 170 can be a folded seam that has a first fold 172 and a second fold 174. The first fold 172 can form an obtuse angle relative to the outer surface 114 while the second fold 174 can form an acute angle to the outer surface 114. In some instances, the first fold 172 can extend beyond the second fold 174 by a desired distance. It is appreciated that the first fold 172 is positioned over the second fold 174 such that the two folds are in alignment and an overlap portion 176 extends beyond the second fold.

Figure 4:
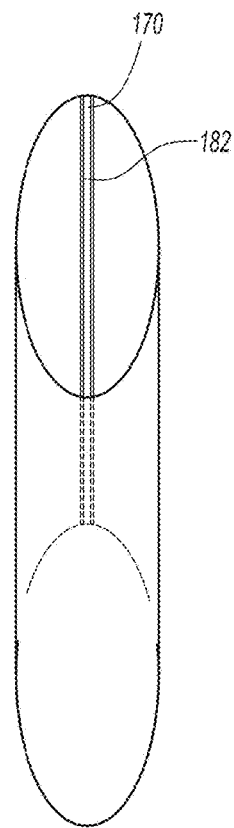
FIG. 4 is a side view of a flexible tube package with a seal strip covering a flat seam.

The first fold 172 and the second fold 174 can be sealed together with the overlapping portion 176 forming a flap 180 that lies flat against the outer surface 114. In some instances, the flap 180 can be secured to the outer surface 114 using a tack seal, an adhesive, a monolayer film, and the like. In the alternative, the flap 180 can be secured to the outer surface 114 using a second strip 182 as illustrated in FIG. 4. The second strip 182 can likewise be secured to the flap 180 and the outer surface 114 using any sealing method or device known to those skilled in the art such as a tack seal, ultrasonic welding, an adhesive, etc. It is appreciated that the flat seam 170 being a folded seal can be advantageous since it can afford a higher seal bond strength than a typical layer-on-layer seal.

Figure 5A:
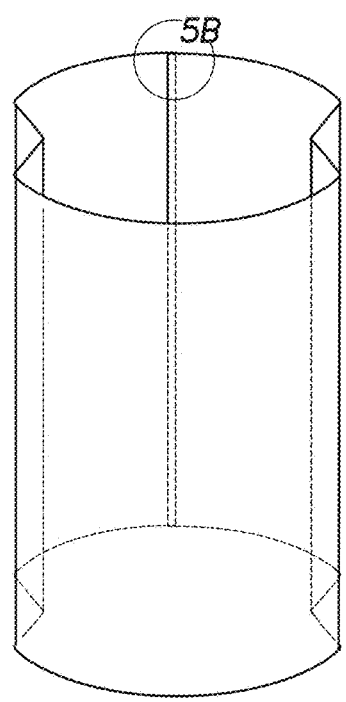
FIG. 5A is a perspective view of a flexible tube package having an integrally formed gusset and an overlap flap seam.
Figure 5B:
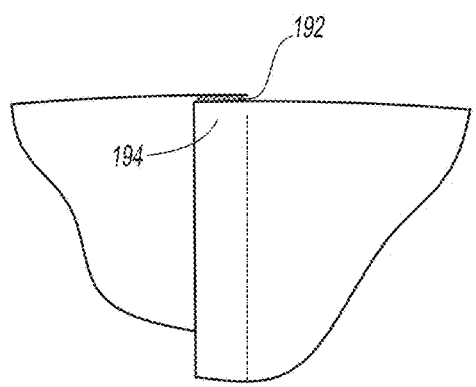
FIG. 5B is a detailed view of the overlap flat seam shown in FIG. 5A.

Referring now to FIGS. 5A and 5B, an overlap flat seam can be provided with a first side edge 192 overlapping a second side edge 194. In the alternative, the first side edge 192 and the second side edge 194 can each have a fold/fold line 192a, 194a as shown in FIGS. 6A-6B. The first side edge 192 can be positioned over the second side edge 194. In some instances, the amount of overlap can be between 5-12 millimeters and the first and second side edges 192, 194 can be sealed together as described above. It is appreciated that the inclusion of a separate layer such as a cast polypropylene (CPP) layer of material on the inside and/or on the outside of the seam can improve the seal strength thereof.

The flexible tube package 10 can also be made from a panel of material having an overlap seam as shown in FIGS. 7A and 7B. In such an embodiment, a first side edge 202 can overlap a second side edge 204 by a predetermined amount. The second side edge 204 can include a fold or fold line 206 while the first side edge 202 does not include a fold or fold line. The second side edge 204 can be folded outwardly 180 degrees along the seal fold line 206 and the first side edge 202 is positioned over the second side edge 204 such that the first side edge 202 is adjacent to the folded second side edge 204. In some instances, an outer portion of the first side edge 202 and an outer portion of the second side edge 204 after it has been folded are in alignment with each other and overlap as shown at 208. It is appreciated that the amount of overlap 208 can be adjusted by the location of the fold line 206 and/or the size of the panel 100, the overlap 208 illustratively being between 5-12 millimeters. The first and second side edges 202, 204 can be sealed together using a process and/or technique as described above and a CPP layer may or may not be added to the inside and/or outside of the seal.

Referring now to FIGS. 8 and 9, a process for forming, filling, and sealing the flexible tube package 10 using a high-speed machine is illustrated. The method begins at step 300 with a first station initiating the forming of the body of the flexible tube package 10. For example, a roll of laminate material 100' can be unrolled along a horizontally oriented plane. The initial width of the roll of material 100' is determined by the desired finished size of the flexible tube package 10 and the number of tube packages or pouches to be obtained from a width of the roll 100'. For example, three or four or six pouches, representing six to twelve panels, can be obtained from a width of the roll of material 100' on a three-lane machine or four-lane or more machine, respectively. Each panel 100 obtained from the roll of material 100' has an inner surface 112 and an outer surface 114.

One layer of the material is preferably preprinted with information or locating indicia, such as a registration mark 111. A plurality of registration marks 111 can be located on the material 100' to denote an edge of the panel and may or may not be read by an optical reading device 400, such as a scanner or registration eye, to index the material in a predetermined position at a cutting station. The preprinted information can also include labeling information that describes the product contained within the flexible tube package 10.

A feature such as reinforcement tape 124 can be optionally positioned and secured to the aligned unrolling section of material 100'. For example and for illustrative purposes only, the reinforcement tape 124 can be positioned on a panel 100 along an upper edge 116 before or after the panel 100 is cut from the unrolled section of material 100'. The reinforcement tape 124 can also be positioned along a lower edge 118, or along one or both of the side edges 120 of the panel 110 in order to provide support to the flexible tube package 10. Various techniques can be used to secure the reinforcement tape 124 to the panel of material 100', such as welding, use of an adhesive, and the like. It is appreciated that the reinforcing tape 124 can provide structural support for the flexible tube package 10 and assists the package in maintaining its tube shape.

The methodology advances to step 305 where the side edges 120 of the walls can be sealed to from the side seal 122. In addition, the end cap 130 and/or the fitment 142 can optionally be sealed to the ends 111 and 113, respectively, at step 305.

It should be appreciated that the upper edge 116 and/or lower edge 118 can be further trimmed. For example, the upper edge 116 and/or lower edge 118 can be trimmed to accommodate the end cap 130 and/or fitment 142, respectively.

At step 310, and assuming the end cap 130 is not attached to the first end 111 at step 305, the end cap 130 can be placed in a holder 250 that affords for movement of the end cap 130 and the tube 110 between filling stations. An example of a holder is a cup-shaped member, as disclosed in commonly assigned U.S. patent application Ser. No. 10/336,601, which is incorporated herein by reference.

At step 315, the tube 110 formed at step 305 can be placed in the holder 250 such that the outer surface 114 of the panel 100 is adjacent the inner surface 133 of the side wall 132. The tube can also be subjected to an opening operation at step 315. Various techniques are conventionally known in the art for opening a tube 110 and/or a flexible tube package 10. For example, a nozzle (not shown) can be mechanically lowered into the tube 110 to direct a stream of compressed gas such as carbon dioxide and/or nitrogen into the tube. In addition, an opening station can include a manifold, with a hood extending over the top of the edges of the tube 110 as known in the art. The manifold can have rows of apertures (not shown) above the upper edge 116 of the tube 110 and the hood can be placed over the tube 110 to assist in maintaining the air pressure in the package. The supply of pressurized gas is directed through the row of apertures to form a plurality of jets of pressurized gas or air. The jets can be directed downwardly onto the upper edge 116 of the panel 100 in the event that the tube 110 has collapsed and needs to be opened. A diving rod (not shown) may then be used to make sure the flexible tube package 10 is fully opened. If the tube 110 has a fitment, such as fitment 142, already attached thereto, the gas can be injected through the fitment aperture 143. In addition, after the flexible tube package is opened, it can be injected with super-saturated steam to eliminate any pathogens and the like.

At step 320, the end cap 130 and the fitment 142 can be joined to the tube 110 as illustrated at reference numeral 115 and 117, respectively. The end cap 130 can be sealed using an ultrasonic seal, a heat weld or the like. At step 325, the flexible tube package 10 can be filled with a product P during a filling operation. For example, a fill tube (not shown) can be lowered into the opened tube 110 with the end cap 130 attached to end 111 and the product dispensed into the open package. The tube 110 can be filled through the fitment aperture 143, or in the alternative, through an open end of the tube 110 before the fitment 142 has been attached to end 113. It is appreciated that if the flexible tube package 10 is large, the package can be filled at more than one station.

In some instances, the product can be naturally carbonated and the flexible tube package 10 is preferably filled while immersed in a nitrogen and/or carbon dioxide atmosphere. If the product is not naturally carbonated and carbonation is desirable, it can be immersed in a carbonator to introduce carbon dioxide into the product. For example, the flexible tube package 10 can be flushed with carbon dioxide as shown at step 330, followed by sealing the product P within the package by attaching the dispensing cap 144 with the sealing cap 148 to the fitment 142 as shown at step 335. After the finishing operation(s), the filled flexible tube package 10 can be discharged from the machine and a plurality of packages can be placed in a container for sales or shipping purposes.

It should be appreciated that the flexible tube package may undergo other processing steps, such as such as an upstream oxygen purging station, downstream oxygen purging station, pasteurization or the like. For example, the filled flexible tube package 10 can be pasteurized in an integral retort chamber (not shown) that heats and then cools the package 10. In addition, the flexible tube package 10 can be tested, such as burst testing or the like prior to packaging for shipping. These additional processing steps may take place at a station on the form/fill/seal apparatus, or on another apparatus.

Structure of Pouch Panel Laminate Material

Figure 10:
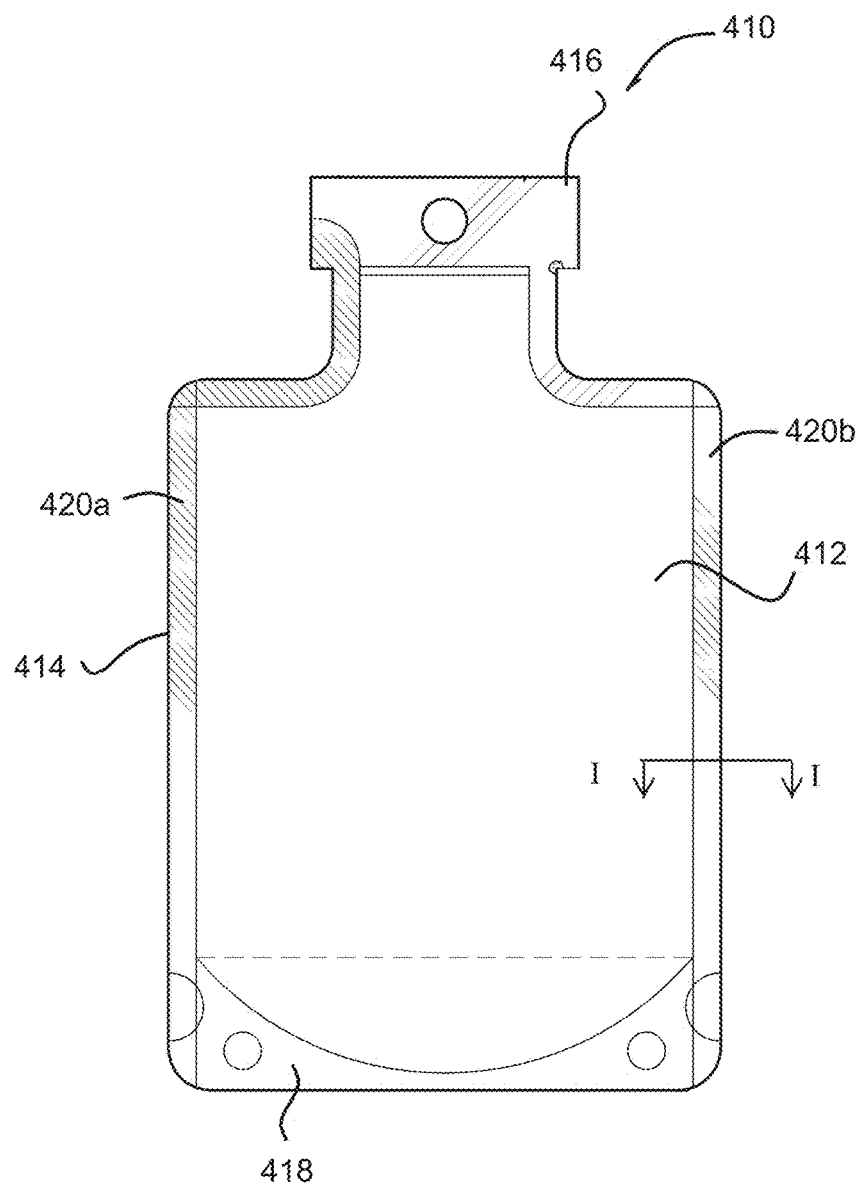
FIG. 10 is an alternative embodiment of the flexible pouch.

With reference to FIG. 10 an alternative embodiment of the flexible pouch will now be discussed.

The pouch 410 is formed from at least one pouch panel formed of a laminate material. The pouch panel has an inner surface that is adjacent the product, and an outer surface. The pouch 410 formed out of the pouch panel has a front wall 412 and a back wall 414. Each wall 412, 414 is further defined by an upper edge 416, an opposed lower edge 418, and first and second side edges 420a, 420b extending therebetween the upper and lower edges 416, 418. The side edges 420a, 420b of the pouch panel form a sealed seam. The pouch may include two side seams if made from two panels or one single seam if made from one panel. In an example of a pouch formed using a single panel of material, the side edges 420a, 420b may be joined along a center seam, as shown in FIG. 1 at 121. The seam may be a flat seam. In an example of a pouch 410 formed using two panels of material, the edges are joined along two side seams. Again, the side seam may be a flat seam.

Figure 11:
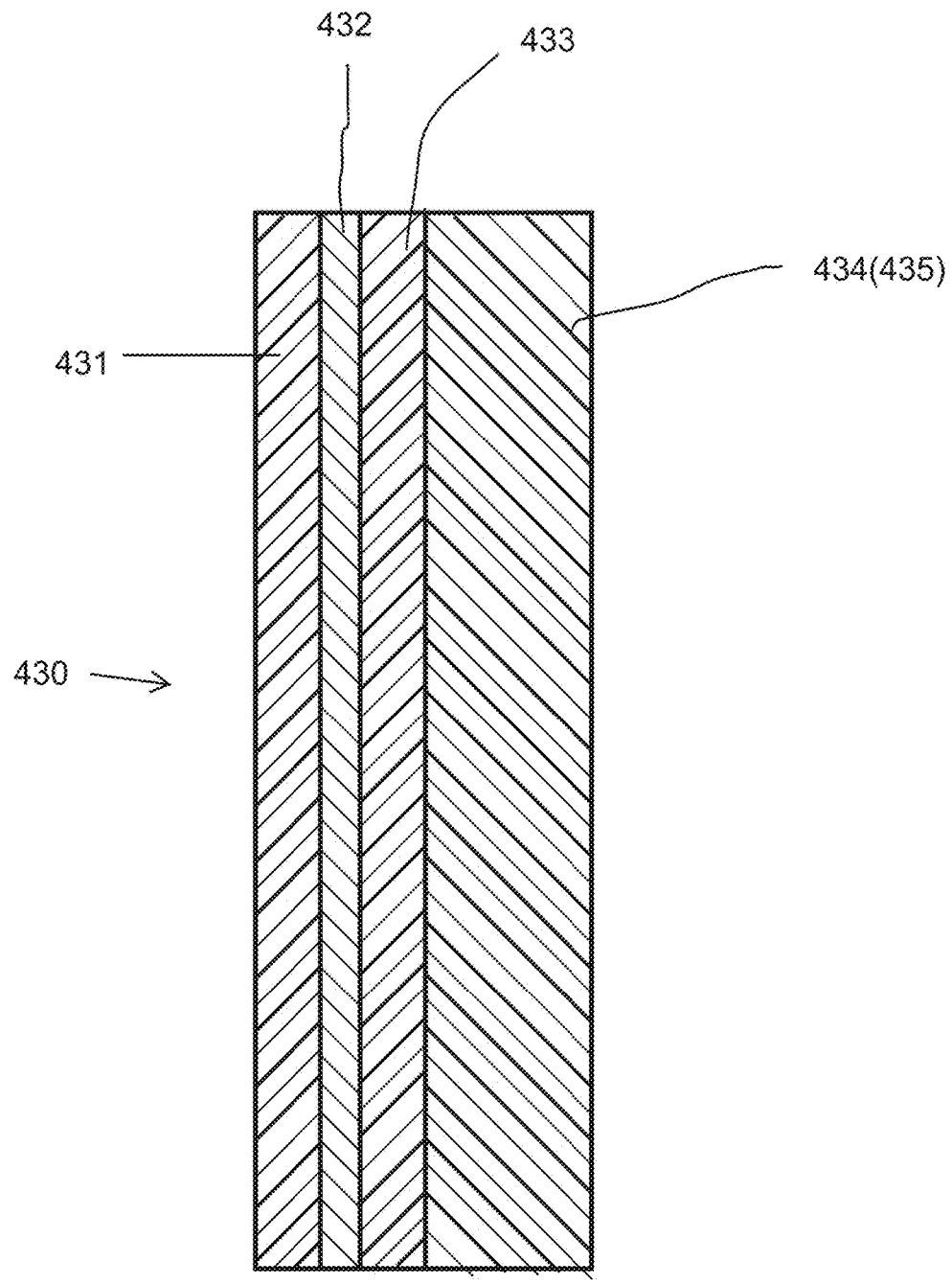
FIG. 11 is partial cross sectional view of line I-I of FIG. 10.

In order to provide sufficient protection against oxygen permeability and protection from the development of undesirable flavors that effect sensory qualities, the pouch panel is formed of a laminate material 430, as illustrated in FIG. 11. Specifically, the laminate material 430 is formed of a layer of polyethylene terephthalate (PET) 431, a layer of foil aluminum (AL) 432, a layer of nylon (NY) 433, and a layer of polyethylene (PE) 434. It is appreciated that the layer of polyethylene is formed of a linear low density polyethylene (LLDPE) 435.

The laminate material 430 is organoleptic compliant in order to avoid the transfer of odor contaminates into the liquid product, or product contamination during the shelf life period of the liquid product.

The laminate material 430 is well suited for packaging liquid beverages having an alcoholic content, such as wine (red or white), beer or spirits. The PET layer 431 is the outermost layer that forms the outer surface of the pouch panel. The PET layer 431 is beneficial as labeling or other indicia can be imprinted thereon. The AL layer 432 provides protection from light, moisture and allows the pouch to additional metallic properties. The NY layer 433 protects the AL layer 432 from cracking, and provides additional strength to the pouch 410 to aid in the retention of the pouch shape even after a portion of the product has been removed.

The PE layer 434 or the LLDPE layer 435 allows for the containment of frozen liquids, vacuum and the retort at 120C.

A particular advantage of the laminate material 430 is provided with the arrangement of the PET layer 431, the AL layer 432, the NY layer 433 and the LLDPE layer 435 laminated in order, with the PET layer 431 as an outermost layer that forms the exterior of the pouch 410 and the LLDPE layer 435 as an innermost layer that forms the interior of the pouch 410.

It is appreciated that a material structure formed of PET/EVOH/PE or AL/PET/NY/PE is particularly well suited for the storage of white wine. Similarly, a material structure for red wine includes PET/EVOH/PE, or AL/NY/PET/PE. Still another example of a material structure is a 7-layer structure that includes a co-extruded laminate, such as PET/CO-PP/AL/NY/LLDPE, or the like.

As described below in greater detail. particular advantages of the laminate material 430 is provided with the following first formulation: PET layer 431 having a thickness of 12-15µ (micros), the AL layer 432 having a thickness of 7-9µ (micros), the NY layer 433 having a thickness of 12-18-µ (micros), and the LLDPE layer 435 (the PE layer 434) having a thickness of 70-200µ (micros). Specifically, a laminate material 430 with a particular second formulation: PET layer 431 having a thickness of 12µ (micros), the AL layer 432 having a thickness of 7µ (micros), the NY layer 433 having a thickness of 15µ (micros), and the LLDPE layer 435 having a thickness of 80µ (micros).

The formulation of the laminate material 430 is maintained at the above second formulation; however, the thickness of at least one of the AL layer 432 and the LLDPE layer 435 increase as a size of the pouch 410 increases. The increases in thicknesses of at least one of the AL layer 432 and the LLDPE layer 435 correlate with an increase in an overall size of the pouch 410 or with increases in a containable product quantity within the pouch 410. The increases in the thickness of at least one of the AL layer 432 and the LLDPE layer 435 due to increase in the size of the pouch are maintained within the prescribed ranges of the first formulation.

As shown in the following empirical data 1 and empirical data 2, a shot pouch formed of a laminate material 430 of the second formulation (PET layer 431 of 12µ; AL layer 432 of 7µ; NY layer 433 of 15µ; and LLDPE layer 435 of 80µ underwent a first testing to evaluate shelf life including 1) sensory qualities and 2) weight loss, and underwent a second testing to evaluate shelf stability including 1) oxygen concentration in packaged head space, 2) sensory qualities of taste, flavor, aroma and color, and 3) chemistry in terms of presence and concentration of volatile organic compounds. As shown by the following test data, the second formulation (PET layer 431 of 12µ; AL layer 432 of 7µ; NY layer 433 of 15µ; and LLDPE layer 435 of 80µ provides unexpectedly high shelf life and shelf stability.

Empirical Data 1

Shelf Life Study—Vodka was filled into 50 mL shot pouches formed of a laminate material having the second formulation (PET layer 431 of 12µ; AL layer 432 of 7µ; NY layer 433 of 15µ; and LLDPE layer 435 of 800. The vodka used was taken from 1.5 L PET bottle of vodka that was used as the "control" sample for comparison purposes. Vodka was chosen for this testing since it has minimal taste thus flavor migration from the package into the product can be detected.

Weight loss of vodka was also monitored over time to determine if the pouch provided sufficient barrier to prevent permeation loss of the product.

The vodka in both the control PET bottle and in the shot pouches were stored at ambient temperature (approx. 73° F.) and atmospheric oxygen conditions (20.9% oxygen). The shot pouches samples were tested every 2 months for a period of 18 months for weight loss and sensory evaluation.

1) Sensory Evaluation

The vodka was diluted 1 part vodka to 1 part spring water. The smell and taste of the diluted vodka was evaluated using the standard Triangle Difference testing method. Triangle Difference testing determines if the test samples (vodka in shot pouches) can be differentiated from the control sample (vodka stored in 1.5 L PET bottle). Experienced ten member panelists were used for the sensory evaluation. Members of the sensory panel were presented with three sets of vodka samples of equal volume. Each sample is coded with a random three digit number. Of the three samples presented, two sets are the same (test sample or control) and one set is different or "odd" (control or test sample). Panel members are asked to identify the "odd" sample and record them on a ballot along with the degree of perceived difference (slight, moderate, much and extreme) and comments about the odd and duplicate samples.

Water and unsalted crackers were provided so that panelist could cleanse their palette between each sample tasting. Seven comet answers in a ten member panel indicate a true difference between the test and control samples at a 95% confidence level. There is about a 5% probability that seven out of ten panelists will correctly identify the "odd" sample by guessing alone.

Table 1 below illustrates the Triangle Difference Test for Vodka stored in shot pouches.

| Test Month | Score out of 10 | Comment |
| --- | --- | --- |
| 2 | 5 | No difference between the test sample and control at the 95% confidence level. |
| 3.5 | 5 | No difference between the test sample and control at the 95% confidence level. |
| 6 | 2 | No difference between the test sample and control at the 95% confidence level. |
| 8 | 4 | No difference between the test sample and control at the 95% confidence level. |
| 10 | 1 | No difference between the test sample and control at the 95% confidence level. |
| 12 | 3 | No difference between the test sample and control at the 95% confidence level. |
| 14 | 3 | No difference between the test sample and control at the 95% confidence level. |
| 16 | 2 | No difference between the test sample and control at the 95% confidence level. |
| 18 | 3 | No difference between the test sample and control at the 95% confidence level. |

As shown in Table 1, there is no statistical significant difference (at the 95% confidence level) between the vodka stored in the shot pouches and the PET control bottle.

2) Weight Loss

The weight of five shot pouches filled with vodka was monitored for vodka weight loss from the pouch over the 18 month period.

Table 2 below illustrates the results of the weight loss study of the vodka stored in the five shot pouches samples over a 487 day trial, weight of the shot pouches is measured in grams.

| | Elapsed Days | | | | | | | | |
| --- | --- | --- | --- | --- | --- | --- | --- | --- | --- |
| | 0 | 36 | 122 | 192 | 243 | 304 | 431 | 482 | 487 |
| Sample 1 | 49.0969 | 49.0934 | 49.0885 | 49.069 | 49.0829 | 49.0797 | 49.0672 | 49.0638 | 49.064 |
| Sample 2 | 48.0756 | 48.0665 | 48.0611 | 48.0582 | 48.0582 | 48.0554 | 48.045 | 48.0424 | 48.0425 |
| Sample 3 | 48.0171 | 48.013 | 48.0083 | 48.006 | 48.0028 | 47.9992 | 47.9872 | 47.9838 | 47.9837 |
| Sample 4 | 49.3915 | 49.3885 | 49.3871 | 49.3862 | 49.3838 | 49.3817 | 49.3728 | 49.3708 | 49.3709 |
| Sample 5 | 48.2728 | 48.2698 | 48.2681 | 48.2674 | 48.2649 | 48.2629 | 48.2541 | 48.2518 | 48.2519 |

Table 3 below illustrates results details in regard to the weight loss study of the vodka stored in the five shot pouches samples.

| Sample # | Weight Loss per Day (g) | Weight Loss per Tear (g) |
| --- | --- | --- |
| 1 | 6.74E−05 | 0.0246 |
| 2 | 6.10E−05 | 0.0223 |
| 3 | 6.75E−05 | 0.0247 |
| 4 | 4.23E−05 | 0.0154 |
| 5 | 4.26E−05 | 0.0156 |
| Average | | 0.0205 |
| Standard Deviation | | 0.0047 |

As shown in Table 3, the weight loss of the vodka stored in the Shot Pak® pouches was minimal over the 18 month time period (0.02 g loss per year average). Based on an average 46 g sample of vodka product in each pouch, there is a 0.04% loss per day.

As such, the second formulation of the laminate material 430 (PET layer 431 of 12μ; AL layer 432 of 7μ; NY layer 433 of 15μ; and LLDPE layer 435 of 80μ provides unexpectedly high shelf life in terms of both sensory evaluation and weight loss prevention.

Empirical Data 2

Shelf Stability Study—shot pouches formed of a laminate material having the second formulation (PET layer 431 of 12μ; AL layer 432 of 7μ; NY layer 433 of 15μ; and LLDPE layer 435 of 80μ were tested to evaluate the stability of the pouch, having a distilled spirits stored therein, over eight (8) months of storage under ambient conditions and pouches stored in challenging conditions (100% oxygen atmosphere).

The stability of the shot pouch is defined as evidence of no significant change in three important product characteristics: 1) oxygen concentration in packaged head space, 2) sensory qualities of taste, flavor, aroma and color, and 3) chemistry in terms of presence and concentration of volatile organic compounds. As such, the scope of work consisted of three tasks aimed at oxygen permeability, sensory quality and gas chromatography testing.

1) Oxygen Permeability—

Oxygen Permeability Set Up—Eight shot pouches were filled with nitrogen gas to create a "pillow pack" of nitrogen that eliminated as much oxygen as possible in the sealed pouches. Sixty (60) such "pillow pack" pouches were then placed in a 100% oxygen atmosphere maintained in a specially designed chamber constructed in our laboratory for this purpose.

A custom-designed oxygen chamber with necessary monitoring and control instrumentation was constructed. The storage chamber consisted of a solid plastic container with removable cover that featured snap closing and leak resistant sealing characteristics. Two small holes were drilled through the top, one for the oxygen inlet and the other for the gas to purge out slowly when a positive pressure was maintained inside the chamber. A plastic pipe, that fitted the hole, was inserted to reach deep into the chamber to maintain a constant and uniform gas environment throughout the chamber. The other end was used as the gas inlet, and was fitted into the needle valve through a gas flow meter that constantly measured the flow rate of the oxygen moving into the chamber. This work included installing necessary valve mountings at the oxygen pipeline opening (ball and needle valves). All the possible openings, including the holes and top sealing area, were properly sealed using silicon gel. For the oxygen supply, proper pressure gauges and valve mountings were installed on the gas cylinder and the cylinder was attached to the gas pipeline.

After the initial setup, the assembly was first put to test for various requirements such as: the level of oxygen that can be maintained in the chamber; flow rate required to maintain that amount of oxygen; the rate at which gas was being consumed in order to estimate future requirements and expenditures. This testing was carried out by purging the chamber with a high flow rate of oxygen initially, and then bringing it down to a lowered constant rate and observing the oxygen concentration and flow rate over a period of days.

Oxygen Permeability Testing and Results—Eight pouches were tested for residual oxygen levels at zero time when the pouches were first placed in the oxygen chamber. Eight more nitrogen filled pillow pack pouches were removed from the chamber after a period of nearly 8 months (230 days), and also tested for residual oxygen levels. Oxygen concentrations were measured using a Mocon® Pac Check® 650 oxygen analyzer. By knowing approximate headspace volume and any change in mean oxygen concentration data over the elapsed storage time, the approximate rate of oxygen ingress could be calculated.

Eight replicate samples were tested at zero time and at the 8-month time frame, while twenty replicate samples were tested at the 14-month time frame to reveal natural sample-to-sample variability. The mean of all 8 samples at zero time was 0.94% as compared with 1.7% after 8 months storage, and 2.02% after 14 months. A statistical comparison of means suggests that these means are different (P=0.017). Therefore, oxygen levels are increasing with time, but very slowly and at a diminishing rate.

Over the first 8 months an approximate oxygen ingress rate of about 0.002 ml/day was estimated from approximate package volumes of 64 ml and a straight-line assumption of increase between initial and 8-month average oxygen concentrations. Over the subsequent 6 months, however, under the same method of estimation the rate of ingress was only half that much (0.001 ml/day). Since test conditions involved exposure to a 100% oxygen atmosphere, it may be expected that actual rates due to exposure to air (21% oxygen) would be about ⅕ these values.

Table 4 below illustrate Percent oxygen concentration in shot pouches filled and sealed with Nitrogen at the beginning (O-time) and after 8 and 14 months storage under 100% oxygen atmosphere.

| Sample Number | 0-Time 0-Days % oxygen | 8-Month (230 days) % oxygen | 14-month (425 days) % oxygen | 14-month (replicates) % oxygen |
| --- | --- | --- | --- | --- |
| 1 | 0.792 | 1.11 | 1.59 | 2.18 |
| 2 | 0.73 | 0.972 | 1.81 | 2.57 |
| 3 | 1.38 | 1.13 | 3.77 | 1.58 |
| 4 | 0.772 | 2.87 | 1.44 | 2.91 |
| 5 | 1.57 | 1.63 | 2.09 | 2.17 |
| 6 | 0.785 | 1.78 | 1.27 | 1.92 |
| 7 | 0.767 | 1.43 | 1.39 | 2.26 |
| 8 | 0.707 | 2.66 | 2.69 | 1.54 |
| 9 | | | 2.39 | 1.57 |
| 10 | | | 1.40 | 2.02 |
| Mean Value | 0.94 | 1.70 | 2.00 | 2.04 |
| Permeability Ingress rate | | 0.002 ml/day | 0.001 ml/day | 0.001 ml/day |
| Standard Deviation | 0.0337 | 0.715 | | |
| Median | 0.778 | 1.53 | | |
| Average Absolute Deviation from Median | 0.194 | 0.537 | | |

Based on the test data, some oxygen permeability was evident, but at a very low ingress rate of about 0.002 ml/day over the first 8 months, which diminished to 0.001 ml/day over the subsequent 6 months when sealed pouches were exposed to a 100% oxygen atmosphere. Actual rates when exposed to air (21% oxygen) would be about ⅕ this value or about 0.0004 ml/day down to 0.0002 ml/day. Accordingly, the shot pouches (pillow pack pouches) of the second formulation have unexpectedly high oxygen permeability prevention.

2) Sensory Evaluation

Sensory Taste Panel testing for characterizing and differentiating between the color, flavor, smell and taste of "old" and "new" shot pouches containing liquor samples was carried out using a standard "Triangle Difference Test". The basis of this type of test is that the panelist is given three samples, out of which two are exactly the same and the third one is different. The panelist is asked to identify the odd sample out of the three.

Sensory Evaluation Set Up—In this study, each of four panelists was subjected to a series of two tests on each of five different flavors (Lemon Drop, Kamikaze, Sour Apple, Vodka, and Purple Hooter). In one test, the panelist was presented with two new samples and one old. The other test consisted of one new and two old samples. Thus, a total of 40 tests were carried out with three samples each. The samples were served in 1 oz. food grade plastic cups containing 10 ml each of the sample liquor. All the samples/cups were carefully coded with random 3 digit numbers prior to conducting the tests, so as to keep anonymity of the content of the sample or its origin. Panelists were asked to take a short break between tests, and they were provided with plain crackers and water to clean their palate during that break or prior to each test.

Panelists were also given a data sheet for each test in order to record their observations (Table-2). On the sheet, the panelists were asked to identify the odd sample in the test and the degree to which they felt the difference in the color and/or taste or flavor exists. They were also encouraged to comment on any other notable difference they encountered during the test. After the taste panel testing, test analysis sheets were collected and used for difference analysis.

Samples of each product flavor (Vodka, Whiskey, Tequila, Rum, Lemon Drop, Sour Apple, Purple Hooter and Kamikaze) were placed under room storage at ambient conditions and were withdrawn for taste testing after 8 months of storage, when recently manufactured (new) samples were made available to serve as controls. Only five of the eight different flavors were made available for use as controls (Lemon Drop, Kamikaze, Sour Apple, Vodka, and Purple Hooter).

Figure 12:
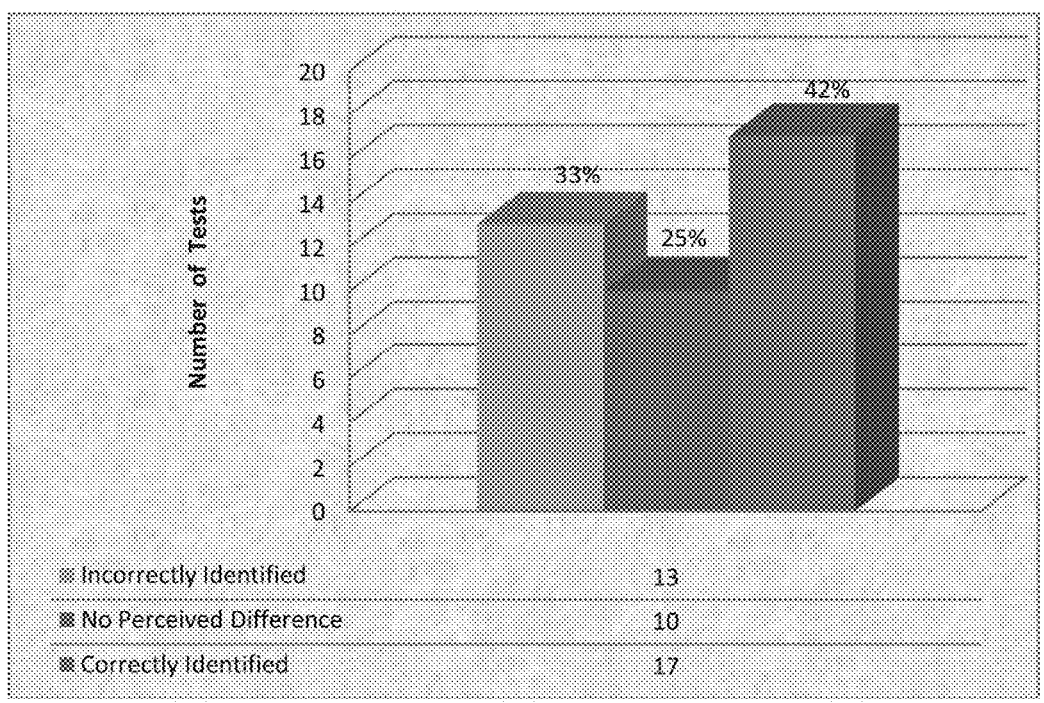
FIG. 12 illustrates results from "Triangle Difference Tests" on shot pouch liquor samples showing number of tests from which the odd sample was incorrectly identified (right), correctly identified (left), or could not be identified (center).

Sensory Evaluation Testing and Results—A "Triangle Difference Test" was carried out for sensory taste panel testing. The Triangle Difference Test is most suited for characterizing and differentiating color, flavor, aroma and taste between aged and fresh samples. A group of four untrained panelists were given three samples of the same flavor out of which two were the same (aged eight months or fresh control) and the third was different. After tasting, smelling and visually examining all three samples, the panelists were asked to identify the odd sample out of the three, and provide comments on what differences were perceived and to what extent Results from the "Triangle Difference Tests" on the shot pouch liquor samples are summarized in FIG. 12. The bar graph in FIG. 12 shows the number of test responses in which the odd sample was incorrectly identified (left bar 33%), correctly identified (right bar 42%), or could not be identified at all (center bar 25%). Out of the 40 tests performed by four panelists on five different flavors, only 17 odd samples were identified correctly; and among the remaining 23 tests either an incorrect sample was identified as the odd sample (13 tests) or the panelists could not find any difference at all between the samples (10 tests).

Thus, nearly 60% of all respondents failed to distinguish any difference between aged and fresh samples, and the 40% that correctly identified odd samples indicated that any difference they perceived was nearly imperceptible. In more than 90% out of all the 40 tests there was no notable difference reported in color of aged and fresh samples among the five different flavors tested, thus showing good color stability over the 8-month storage period.

As shown in FIG. 12, no significant change in sensory quality could be detected. The majority of all respondents failed to distinguish any difference between aged and fresh samples, and those that correctly identified odd samples indicated that any difference they perceived was nearly imperceptible. Moreover, since no apparent change in sensory quality could be detected by panelists in the Triangle Difference test, little significance can be given to the very low rate of oxygen permeability that was detected in the shot pouches.

3) Gas Chromatography

Gas chromatographic analysis of the volatile compounds present in "old" and "new" samples of two selected flavors (Lemon Drop and Sour Apple) was also carried out to see if any significant changes could be detected in the peak profiles between old and new samples.

Gas Chromatography Set Up—An HP 5890 Series II Plus Gas Chromatograph was used for the chromatographic analyses in this study. The gas injector was fitted with a special fiber thread that absorbed volatiles in the headspace of the pouch. The thread was safely enclosed in the metal needle casing of the injector, and was only brought out when exposure to the volatiles or to the chromatograph was needed. When ready for testing, the shot pouch was slit open and exactly 10 ml of the sample product were immediately transferred to a 50 ml glass vial using a glass pipette. These were special glass vials with unique silicon caps (septum) fitted in metal casings.

The vials were capped and placed in a hot water bath maintained at 40° C. for a period of 20 minutes. This assured that all samples were at the same constant temperature and all the volatiles were evenly distributed throughout the vial headspace. Then, the gas injector needle was inserted into the silicon septum and finally the fiber thread exposed to the vial headspace, while the vial was still sitting in the bath maintained at the same temperature. Care was exercised to prevent the thread from touching the liquid sample at the bottom. After an exposure of 30 minutes, the injector was removed from the vial and immediately injected into the gas chromatograph and the cycle was started with the thread exposed to the chromatograph for 34 minutes.

Figure 13A:
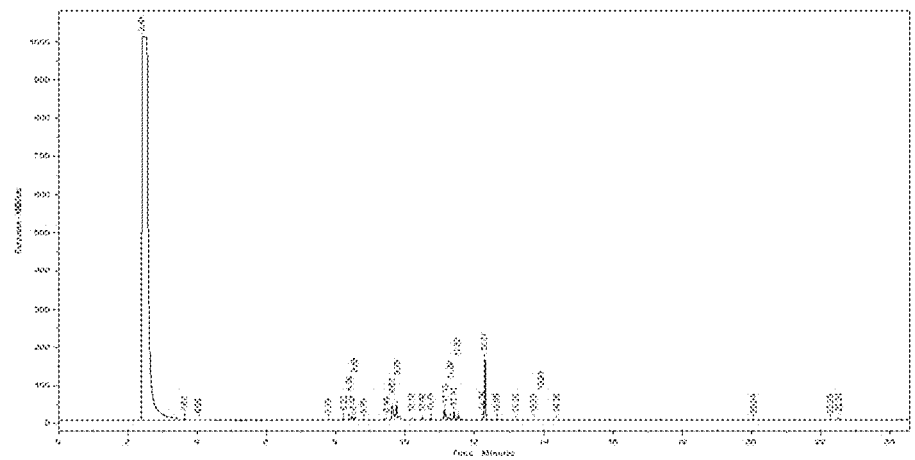
FIG. 13A illustrates a gas chromatograph result of a new sample of a shot pouch containing Lemon Drop over the overall 24 minute spectrum.
Figure 13B:
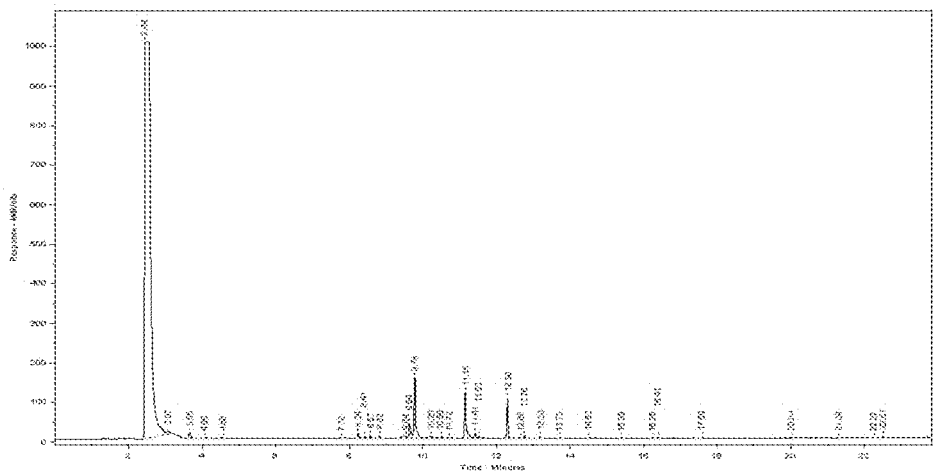
FIG. 13B illustrates a gas chromatograph result of an aged sample of a shot pouch containing Lemon Drop over the overall 24 minute spectrum.
Figure 14A:
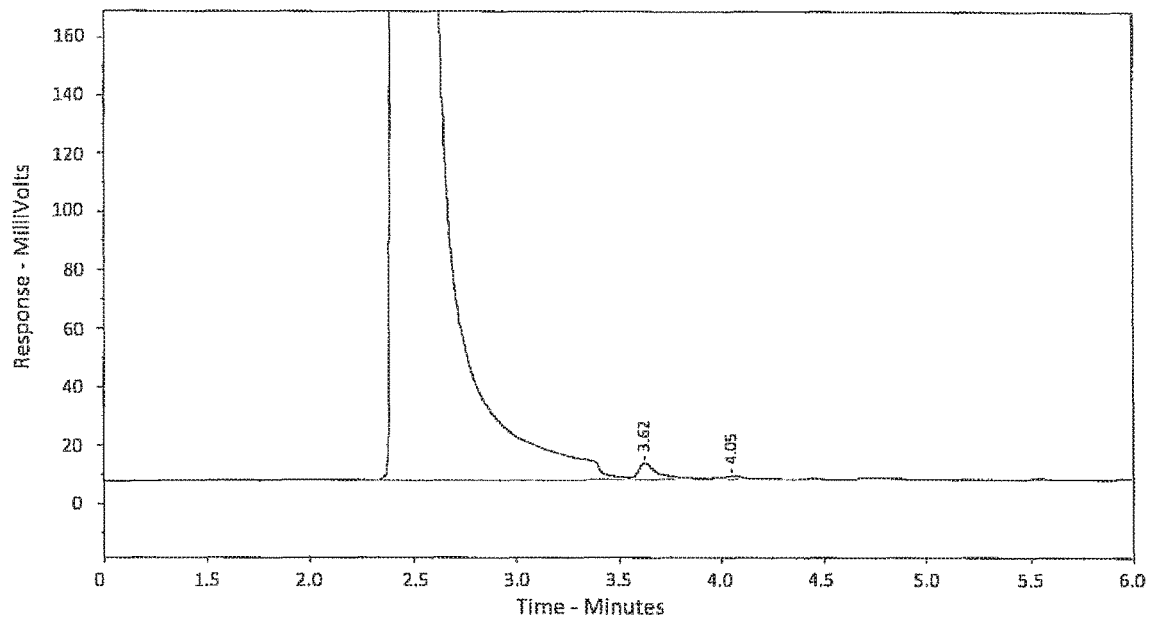
FIG. 14A illustrates a gas chromatograph result of a new sample of a shot pouch containing Lemon Drop magnified over the 1-6 minute range.
Figure 14B:
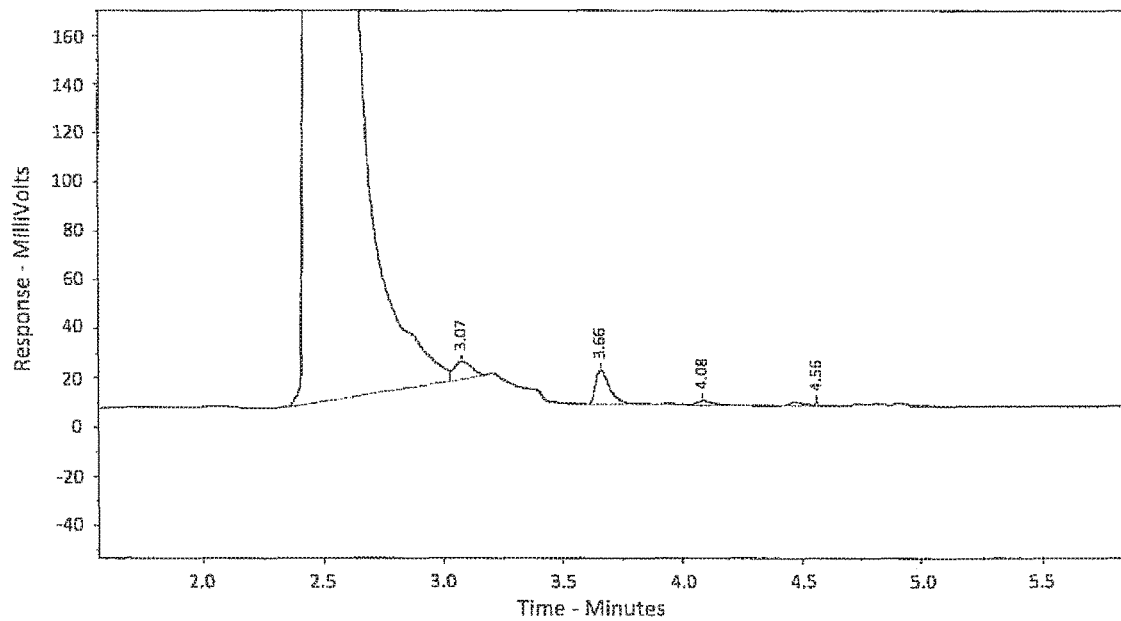
FIG. 14B illustrates a gas chromatograph result of an aged sample of a shot pouch containing Lemon Drop magnified over the 1-6 minute range.

Gas Chromatograph Results—Chomatographs showing results from gas chromatography analysis on samples of Lemon Drop and Sour Apple ShotPak samples are given in FIGS. 14A-18B. The overall 24-minute spectra for new and old samples of Lemon Drop are shown in FIGS. 13A, and 13B, respectively. The predominant tall peak appearing first in the spectra is likely to be ethanol, the volatile organic compound of highest concentration in the sample. The remaining smaller peaks reveal the presence of other volatile organic compounds in relatively trace amounts. Presence or absence of a peak at a given point in time on the spectrum (retention time) indicates presence or absence of that compound in the sample, while the area under the peak is proportional to the concentration of that compound in the sample.

No differences in presence or absence of peaks and their locations in retention time are apparent between the new and old sample of Lemon Drop flavor in FIGS. 13A and 13B. However, differences in peak height among the various smaller peaks that appear later in retention time are apparent. These later segments of the spectra are magnified in FIGS. 14A-14B and 15A and 15B.

Figure 15A:
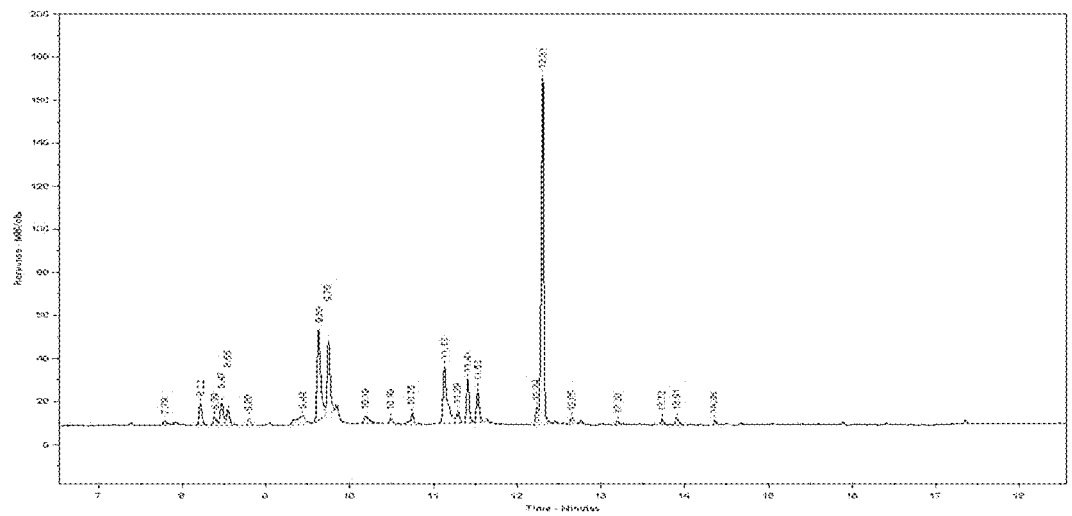
FIG. 15A illustrates a gas chromatograph result of a new sample of a shot pouch containing Lemon Drop magnified over the 7-18 minute range.
Figure 15B:
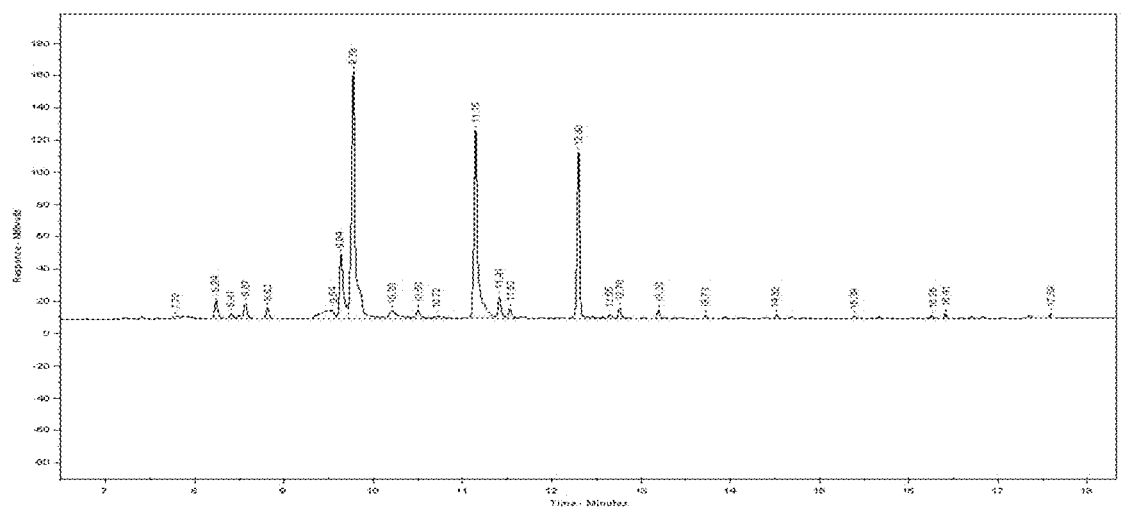
FIG. 15B illustrates a gas chromatograph result of an aged sample of a shot pouch containing Lemon Drop magnified over the 7-18 minute range.
Figures 16A, 16B:
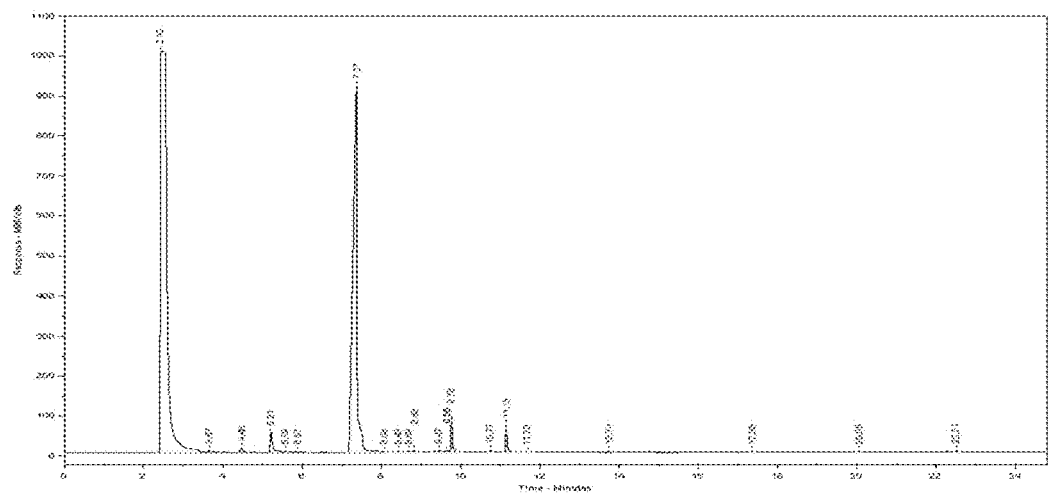
FIG. 16A illustrates a gas chromatograph result of a new sample of a shot pouch containing Sour Apple over the overall 24 minute spectrum.
FIG. 16B illustrates a gas chromatograph result of an aged sample of a shot pouch containing Sour Apple over the overall 24 minute spectrum.
Figure 17A:
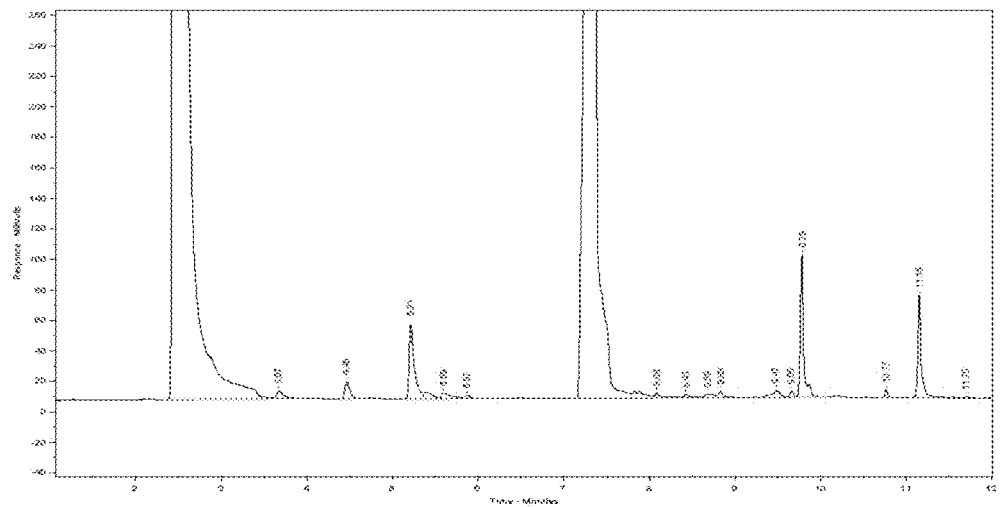
FIG. 17A illustrates a gas chromatograph result of a new sample of a shot pouch containing Sour Apple magnified over the 2-12 minute range.
Figure 17B:
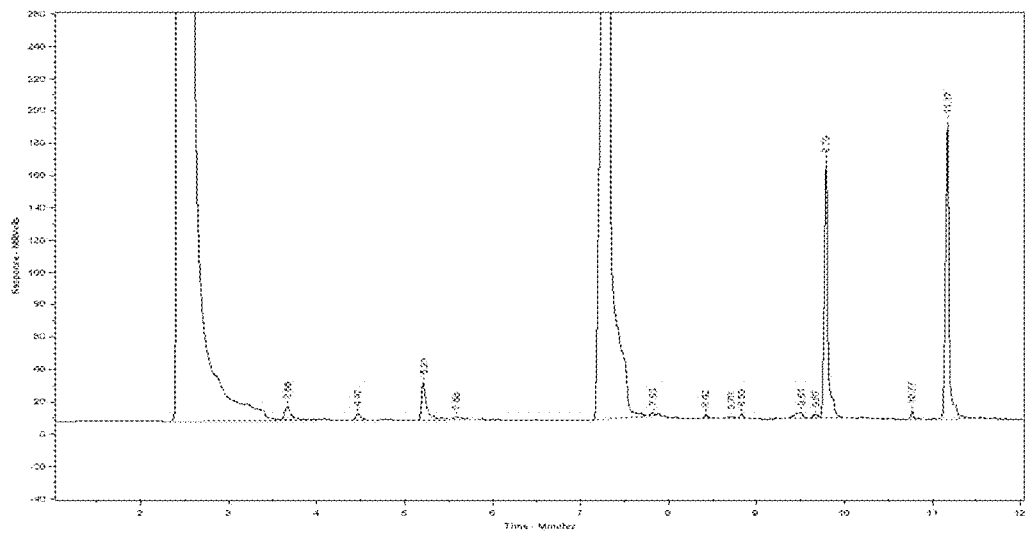
FIG. 17B illustrates a gas chromatograph result of an aged sample of a shot pouch containing Sour Apple magnified over the 2-12 minute range.
Figure 18A:
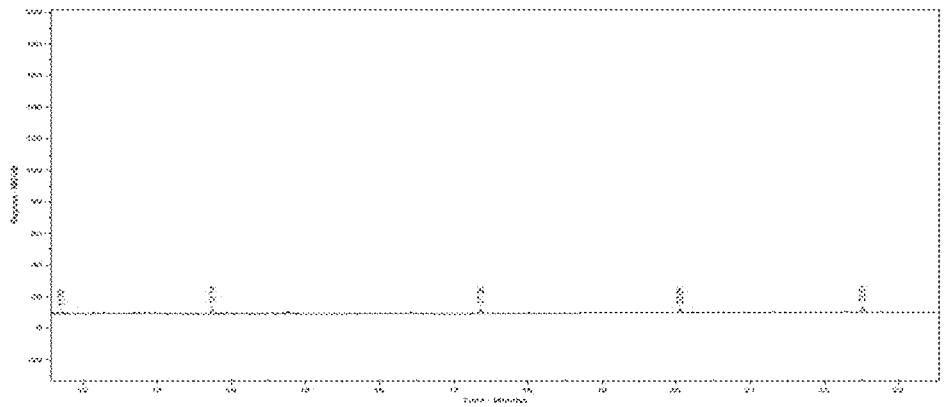
FIG. 18A illustrates a gas chromatograph result of a new sample of a shot pouch containing Sour Apple magnified over the 12-24 minute range.
Figure 18B:
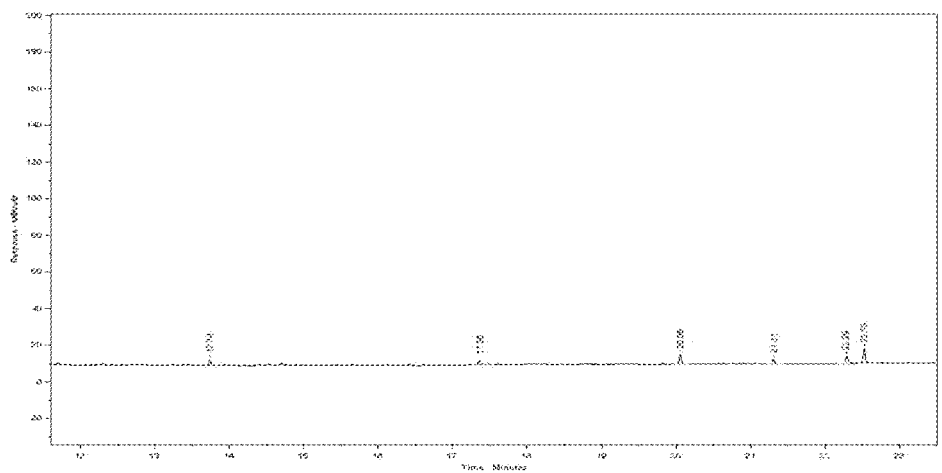
FIG. 18B illustrates a gas chromatograph result of an aged sample of a shot pouch containing Sour Apple magnified over the 12-24 minute range.

A closer look at the presence or absence of minor peaks in these figures shows that the response curves are slightly different from each other, particularly in FIGS. 15A and 15B, indicating small changes in the composition of trace organic compounds between old and new (aged) samples. Of greater significance is the difference in peak height or area under the peaks for certain peaks, such as those occurring between 9 and 12 minutes in FIGS. 15A and 15B. These changes in peak height indicate that some organic compounds in the samples are decreasing in concentration with time, while others are increasing.

Similar results are presented for the Sour Apple flavor sample in FIGS. 16A-18B. The entire 24-minute spectrum for new and old samples is given in FIGS. 16A and 16B, while magnifications of segments between 2 and 12 minutes, and 12 and 24 minutes are given in FIGS. 17A-17B and FIGS. 18A-18B, respectively. Changes in peak height can be seen for a number of peaks, such as those appearing at retention times of 5, 10 and 11 minutes. In the case of the Sour Apple flavor, however, no new peaks appear; nor do any original peaks disappear. Thus, there was no change in the presence or absence of volatile compounds over the 8-month storage period. Existing compounds simply increased or decreased slightly in concentration within the sample.

It is impossible to predict changes to product acceptability due to changes in chromatographic peaks. In the event that samples are deemed to be unacceptable, chromatographic data may be used to help identify possible causes. Additionally, peak changes may be the result of internal chemical reactions of the product, reactions with permeating oxygen, scalping of compounds by polymer packaging material or migration of compounds from packaging. Changes in peaks may or may not be due to oxygen exposure, and may be caused by such other factors as those mentioned above.

From the above, gas chromatography results revealed some slight differences in profiles of minor peaks under magnification that may or may not have been caused by the low rate of oxygen ingress.

In the Shelf Stability Study the shot pouches formed of a laminate material having the second formulation (PET layer 431 of 12μ; AL layer 432 of 7μ; NY layer 433 of 15μ; and LLDPE layer 435 of 80μ illustrated unexpectedly high shelf stability over the three tested criteria, and as no apparent change in sensory quality could be detected by panelists in the Triangle Difference test, little significance can be given to the very low rate of oxygen permeability that was detected, nor to the slight differences found in chromatographic peaks.

The present invention has been described in an illustrative manner. It is to be understood that the terminology which has been used is intended to be in the nature of words of description rather than of limitation. Many modifications and variations of the present invention are possible in light of the above teachings and as such the present invention can be practiced other than as specifically described with the scope of the invention provided by the claims.

It is claimed:

1. A flexible pouch for packaging a product therein, said flexible pouch comprising:
   a pouch panel formed of a material having a layer of polyethylene terephthalate, a layer of aluminum, a layer of nylon, and a layer of polyethylene,
   said layer of polyethylene terephthalate having a thickness of 12 microns;
   said layer of aluminum having a thickness of 7 microns;
   said layer of nylon having a thickness of 15 microns;
   said layer of polyethylene having a thickness of 80 microns,
   wherein said layer of aluminum is positioned between said layer of polyethylene terephthalate and said layer of nylon, and
   wherein said layer of nylon is positioned between said layer of aluminum and said layer of polyethylene.

2. The flexible pouch of claim 1, wherein said polyethylene is a linear low density polyethylene.

3. The flexible pouch 1, wherein said layer of polyethylene terephthalate, said layer of aluminum, said layer of nylon, and said layer of polyethylene are laminated in order to form the pouch panel.

4. The flexible pouch of claim 1, wherein said product is an alcoholic beverage.

5. A method of forming a flexible pouch for packaging a product comprising:
   laminating a layer of polyethylene terephthalate, a layer of aluminum, a layer of nylon, and a layer of polyethylene to form a pouch panel; and
   forming a body of said pouch from said pouch panel;
   said layer of polyethylene terephthalate having a thickness of 12 microns;
   said layer of aluminum having a thickness of 7 microns;
   said layer of nylon having a thickness of 15 microns;
   said layer of polyethylene having a thickness of 80 microns,
   wherein said layer of aluminum is positioned between said layer of polyethylene terephthalate and said layer of nylon, and
   wherein said layer of nylon is positioned between said layer of aluminum and said layer of polyethylene.

6. The method of claim 5, wherein said polyethylene is a linear low density polyethylene.

7. The method of claim 6, wherein said layer of polyethylene terephthalate, said layer of aluminum, said layer of nylon, and said layer of polyethylene are laminated in order to form said pouch panel.

8. The method of claim 6 further comprising:
   filling said flexible pouch with an alcoholic beverage.

* * * * *